United States Patent [19]

Truskalo

[11] 3,819,979

[45] June 25, 1974

[54] HIGH VOLTAGE REGULATORS

[75] Inventor: Walter Truskalo, Berwyn, Pa.

[73] Assignee: Philco-Ford Corporation, Blue Bell, Pa.

[22] Filed: May 10, 1973

[21] Appl. No.: 358,991

[52] U.S. Cl. .......... 315/29

[51] Int. Cl. .......... H01j 29/70

[58] Field of Search .......... 315/27 TD, 27 SR, 27 R, 315/28, 29, 25, 26

[56] References Cited

UNITED STATES PATENTS

| | | | |
|---|---|---|---|
| 3,395,311 | 7/1968 | Hursh | 315/29 |
| 3,609,447 | 9/1971 | Hirota | 315/27 TD |
| 3,628,082 | 12/1971 | Dietz | 315/27 SR |
| 3,693,043 | 9/1972 | Wedam | 315/29 |
| 3,721,858 | 3/1973 | Shimizu | 315/29 |

*Primary Examiner*—T. H. Tubbesing
*Assistant Examiner*—J. M. Potenza
*Attorney, Agent, or Firm*—Robert D. Sanborn; Gail W. Woodward

[57] ABSTRACT

A television scan horizontal deflection circuit of the solid state switch variety also provides for the generation of high voltage to operate the display tube. A regulator circuit, connected into the deflection circuit, serves to regulate the high voltage in terms of low voltage power supply variations, such as would result from ordinary power line varitions. When pincushion correction signals are applied to such a circuit the high voltage value tends to vary as a function of the pincushion currents. This introduces raster distortions resulting from capacitive lag in the high voltage power supply. In an improved circuit, the regulator function is established so that it senses the magnitude of the high voltage power supply input pulses thereby maintaining the high voltage constant and avoiding the above-mentioned raster distortions. By incorporating a partial sensing of the deflection into the regulator, good response to changing power supply voltage is also achieved.

6 Claims, 5 Drawing Figures

HIGH VOLTAGE REGULATORS

BACKGROUND OF THE INVENTION

Solid state switching circuits have been applied successfully to television deflection systems because of their high inherent efficiencies. Unlike an amplifier, which must supply output power related to signal input, a switch is either open or closed. When open an ideal switch passes no current and when closed no voltage appears across the switch. For either condition no power is dissipated in the switch. In a practical device some power is consumed in the switching transition. Additional power is consumed in the leakage current when the switch is OFF as well as in the inherent voltage drop when the switch is ON. As a practical matter a solid state switch can control quite large quantities of energy while dissipating very little. This makes them very attractive in the television horizontal deflection and high voltage generation functions which account for most of the power consumed by a television receiver.

Typically the horizontal deflection circuit also supplies the energy for the high voltage generating circuits necessary for operating the display tube. It is common practice to include a simple electronic regulator in the deflection circuit to permit control of the actual magnitude of the high voltage. With this combination of circuit elements, deflection and high voltage (and accordingly raster width) can be held constant even in the presence of substantial low voltage power supply variations. This arrangement avoids a need to regulate the low voltage power supply and is desirable because such regulation is expensive.

The above-described circuits operate well but tend to react badly when pincushion correction circuits are incorporated into the deflection system. Pincushion correction is considered useful for the larger display tubes and for wide angle deflection systems. When pincushion correction currents are present in the horizontal deflection circuit, the regulator will be modulated and the high voltage will vary at the pincushion rate. Since the high voltage circuit includes capacitive filtering, it tends to introduce a lag that results in undesirable raster distortions. These distortions can be reduced by adding still more correction circuits but these tend to complicate the circuits unduly.

SUMMARY OF THE INVENTION

It is an object of the invention to provide pincushion correction in a switch type of horizontal deflection circuit that avoids raster distortions.

It is a further object of the invention to provide a switching type horizontal deflection circuit that maintains constant high voltage while providing pincushion correction.

It is a still further object to provide a switching type deflection circuit having pincushion correction wherein a regulator circuit acting to control deflection is connected to sense the high voltage pulse so as to maintain constant high voltage.

These and other objects are achieved in the following manner. A conventional switching circuit is employed to generate the deflection currents and high voltage pulses in a television display. The circuit includes a regulator connected to control the deflection circuit and arranged to sense the magnitude of the pulses applied to the high voltage rectifier. Thus the regulator acts to adjust the deflection drive so as to establish a constant value of high voltage. The presence of pincushion correction currents in the deflection system do not modulate the regulator and the raster distortions that attend the prior art circuits are avoided.

By permitting the regulator additionally to sense a voltage proportional to deflection, good response to low voltage power supply variations is maintained.

DESCRIPTION OF THE PRIOR ART CIRCUIT

Figure 1:
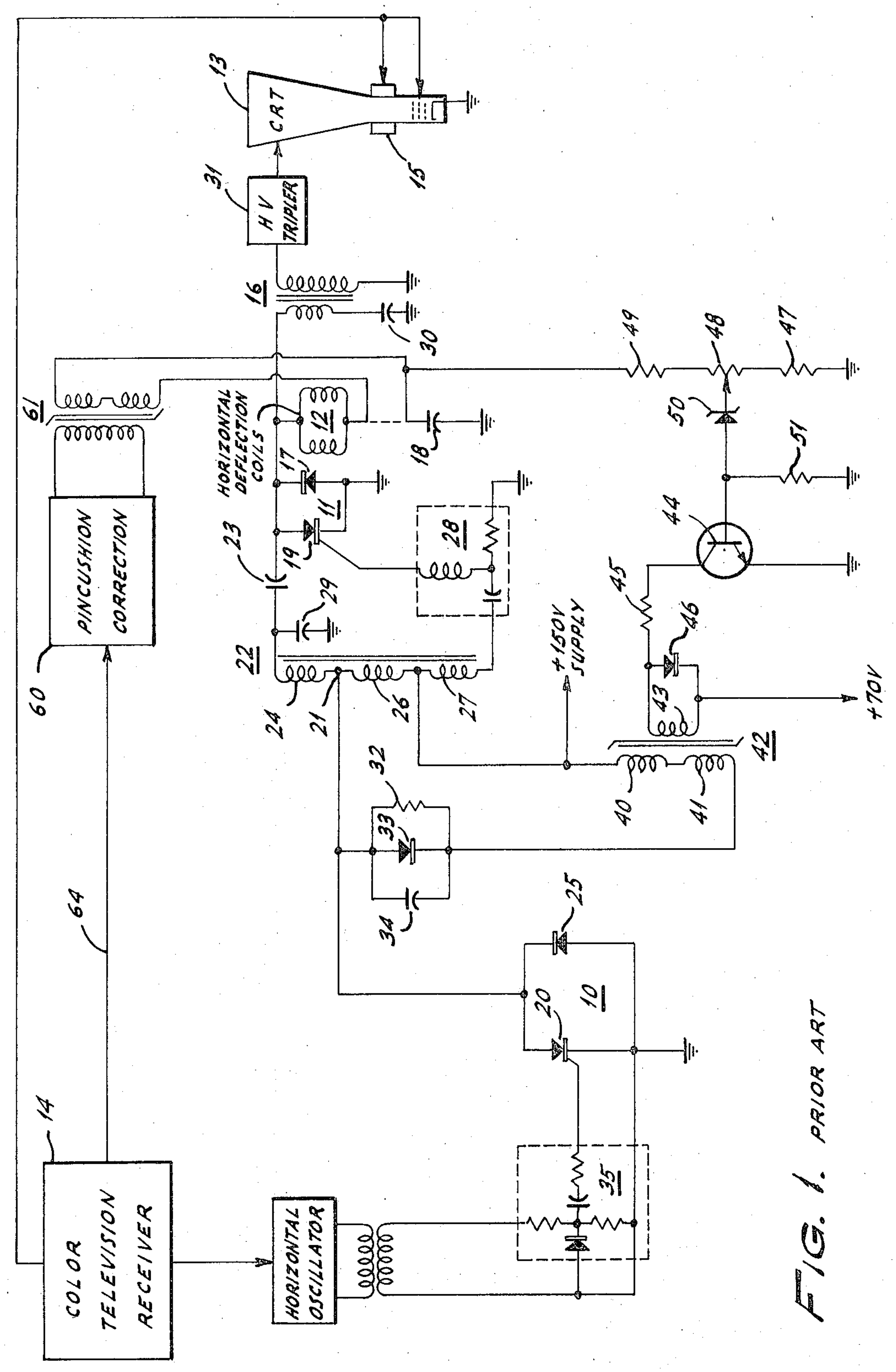
FIG. 1. PRIOR ART
FIG. 1 is partial block-schematic diagram of the prior art switch type deflection circuit.

FIG. 1 shows a prior art horizontal deflection and regulator circuit. The circuit is constructed around two switches, commutator switch 10 and trace switch 11. Each switch consists of a silicon controlled rectifier (SCR) and a shunt diode. The diode is poled oppositely to the SCR so that the switches are bidirectionally conductive.

An SCR is a unidirectional switching device and ordinarily presents a very high impedance to electric current. Once it is rendered conductive, the SCR presents a very low impedance and is accordingly an efficient switch. The low impedance state can be triggered by the gate electrode with the expenditure of very little power. For the devices shown, the arrow shaped electrode is the anode, the facing bar is the cathode, and the connection angled into the cathode is the gate electrode. If a potential below the rated device breakdown is applied between anode and cathode and poled positive to anode, only a very small leakage current will flow. The application of a small positive pulse to the gate electrode (relative to the cathode) will cause the device to turn on and present a very low impedance. At least in ordinary SCR's, once turned on the gate electrode loses control and the low impedance will persist until the anode current drops below a small critical sustaining value. When this occurs the device reverts to its high impedance state until again triggered.

One purpose of the circuit of FIG. 1 is to supply deflection coils 12 with a sawtooth current waveform of suitable linearity. The yoke will then act upon CRT 13 to produce the desired horizontal beam deflection. The drawing also shows the color TV receiver 14 which includes all of the functions not specifically referred to in describing the circuits directly related to the invention. For example receiver 14 provides the required voltages and signals to properly bias and modulate CRT 13 to produce a color picture and this would include conventionally produced vertical deflection signals. While not so portrayed, deflection coils 12 are physically mounted on the CRT along with the vertical deflection coils in yoke 15.

A second purpose of the circuit is to supply high voltage for CRT operation. For this function a sawtooth of current is supplied to transformer 15. This transformer operates a rectifying voltage tripler 31, the output of which is sufficient for operating the CRT.

Figure 2:
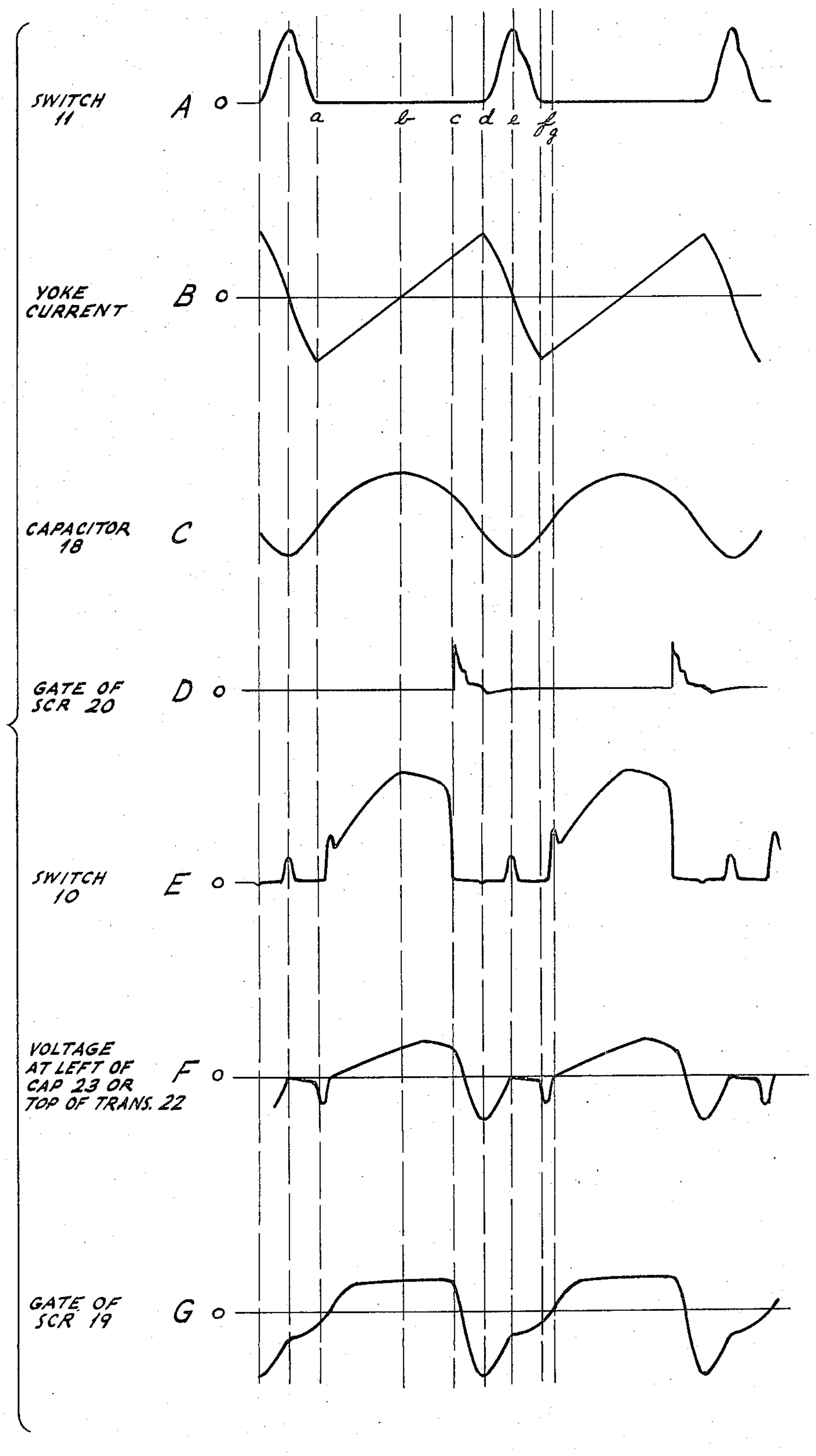
FIG. 2 is a series of waveforms taken at various points in FIG. 1.

The circuit of FIG. 1 functions in accordance with the following description: For reference the waveforms of FIG. 2 will be used. It will be assumed that the circuit has been operating so that starting transient conditions will not be encountered. Referring to waveform B at time a, the maximum negative deflection current is flowing in deflection coils 12 and this will correspond to CRT deflection to the left hand side of the TV raster. This is the instant in time following horizontal flyback. Due to the current flowing in coils 12, a large magnetic field is present and this field will now begin to collapse. The collapsing field will induce a counter voltage across coils 12 of a polarity that will turn diode 17 of trace switch 11 on. For initial discussion the dotted line path between coils 12 and capacitor 18 will be considered. (This path is normally occupied by the secondary of transformer 61 which has an inductance that is small relative to the inductance of coils 12. The action of transformer 61 upon the circuit will be described subsequently.) Thus trace capacitor 18 is effectively connected directly across coils 12 by trace switch 11 and will be charged by the current induced by the collapsing field. Capacitor 18 is made large with respect to a value that would resonate the circuit to the horizontal scan interval. Accordingly the circuit is almost purely inductive but having a small series resistance due mainly to the resistance of the wire in the coils. This means that the current will change in a very nearly linear manner. The magnetic field will therefore collapse in a linear fashion until point b of FIG. 2 is reached. For the time interval a to b, electrons will flow up from coils 12, down through diode 17 to ground, up from ground to the lower plate of capacitor 18, and then up from the upper plate of capacitor 18 through coils 12. As will be described subsequently, the gate of SCR 19 will have been triggered positively, as shown by curve G of FIG. 2, by associated circuit action (to be described in detail below) so as to render SCR 19 conductive by the time *b* is reached. When the field about the coils has collapsed to zero at time *b* on the FIG. 2 time scale, capacitor 18 will begin to discharge through coils 12 by way of SCR 19. Electrons will flow from the lower plate of capacitor 18 to ground, up from ground through the cathode of SCR 19 to its anode, and then down through coils 12 to the upper plate of capacitor 18. Since capacitor 18 is still connected directly across coils 12, now by the conduction of SCR 19, the current will continue to change and will now build up in a linear manner as shown. This linear increase continues from time *b* to time *d*. However, at a suitably phased time labeled *c*, the TV horizontal synch pulse, as shown in waveform D, arrives at the gate electrode of SCR 20 of commutator switch 10 by way of wave shaping network 35. Since this SCR has its anode returned to a positive potential source, the 150V supply line, it will begin to conduct as soon as the gate pulse is applied and will ground terminal 21 of transformer 22. In the time interval *c* to *d* both switches 11 and 10 are conducting. Prior to time *c* capacitor 23 will have charged to a high potential (in the range of 300 volts) positive on the left hand terminal. Starting at time c current will start building up in coil 26 with electrons flowing from ground through SCR 20 to connection 21 down through coil 26 to the +150V supply. At the same time capacitor 23 will begin to discharge through coil 24 and the capacitor charge will be transferred to a magnetic field around coil 24. Electrons flow from the right hand terminal of capacitor 23 to SCR 19 where they subtract from the electrons flowing through the SCR 19 due to the capacitor 18 and coil 12 interaction. The flow continues through ground to SCR 20 and up through coil 24 to the left hand terminal of capacitor 23. This current increases until it reduces the current flowing through the SCR 19 below its sustaining current level and SCR 19 turns off. By the time SCR 19 has turned off diode 17 has become forward biased into conduction thereby maintaining switch 11 closed. The current increases through coil 24 until all the charge on capacitor 23 has been converted into a magnetic field around coil 24 at which time the field starts to collapse, the current decreases and a charge starts to build up in capacitor 23 of the opposite polarity, or positive on the right hand terminal. At time d the decreasing current once again equals the current flowing in coil 18 and at this time diode 17 ceases to conduct. By this time there is no longer a positive gate pulse on SCR 19 and it can not conduct. Therefore at time *d* switch 11 reverts to its high impedance state and the CRT trace is terminated.

At time *d*, with SCR 20 turned on and switch 11 open, deflection coils 12 will be in series combination with capacitors 18 and 23, coil 24, and SCR 20. The field previously built up around coils 12 will start to collapse. The above mentioned series circuit is tuned to resonate at a frequency such that a half cycle will occupy the TV flyback period. Accordingly the field collapse occurs quickly. This action further charges capacitor 23, positive on its right-hand terminal. At time e the current in coils 12 has collapsed to zero and capacitor 23 is charged to a high potential with its right-hand terminal positive. This charge occurs because electrons flow from the right-hand terminal of capacitor 23 down through coils 12 onto the upper plate of capacitor 18. Then from the lower plate of capacitor 18 to ground, up from ground to the cathode of SCR 20, to the anode of SCR 20 (thus aiding the electron flow in coil 26) and then up through coil 24 to the left-hand terminal of capacitor 23. When this current drops to zero, capacitor 23 will start to discharge and electron flow will start to increase in the opposite direction in coils 24 and 12. As the amount of electron flow passes the value of the electron flow in coil 26, the direction of electron flow in switch 10 will reverse, SCR 20 will stop conducting, and diode 25 will begin conducting, thus sustaining the above-described resonance. The small positive pulse at time *e* on waveform E denotes continuation of the resonance action which briefly renders diode 25 nonconductive. When the resonant current again reverses, diode 25 resumes conduction and switch 10 remains closed until time *f*. In its resonant discharge capacitor 23 will rapidly build up the current in coils 12 in the time period *e* to *f* with the electron flow upward in coils 12. In the same time period capacitor 18 is being charged from the energy stored in capacitor 23. At time *f* the current in coils 12 reaches the level where capacitor 23 has completely discharged and starts to change polarity and diode 17 goes into conduction.

At this time the energy in capacitor 23 has been transferred to magnetic fields around coils 24 and 12 and in increase in the charge on capacitor 18. At time *g* the current in coil 24 has decreased in value until it once again is equal to the current in coil 26 and diode 25 will cease to conduct. The current is in the proper direction for conduction in SCR 20 but the gate pulse by this time has terminated, therefore SCR 20 does not conduct and switch 10 reverts to its high impedance state and the operating cycle begins anew. The left-hand terminal of capacitor 23 will then be connected to the 150V supply through coils 24 and 26. This causes transformer 22 to couple a pulse to winding 27 which is phased to produce a polarity that turns SCR 19 on through wave shaping network 28. Waveform G of FIG. 2 shows the gate voltage applied to SCR 19. Thus SCR 19 has its gate turned on so that when its anode goes positive at time *b*, it will become conductive.

Thus far the circuit operation description has omitted mention of capacitor 29. This capacitor, while not essential to circuit operation, is present to add shunt capacitance particularly across switch 11. It will be seen that capacitors 23 and 29 are in series across switch 11. This shunt capacitance prevents large voltage transients from appearing across switch 11, during its open interval, and thereby suppresses voltage surges. When switch 11 is conductive, capacitors 23 and 29 are connected in parallel. The values of the various components including capacitor 23 and transformer 22 are selected to give desired resonances as outlined above when capacitor 29 is connected as shown. Its action therefore does not materially affect the circuit operation as described.

In the above description, capacitor 18 was described as large with respect to any value that would resonate the circuit to the horizontal scan interval. Waveform C of FIG. 2 shows the voltage appearing across capacitor 18 during circuit operation. It discharges during the interval $b - e$ and charges in the remaining time interval in the operating cycle. If made sufficiently large, the variation in voltage would be insignificantly small. In practice the value of capacitor 18 is chosen to linearize the horizontal deflection. In a conventional CRT, the faceplate radius of curvature is much larger than the radius of deflection. For such a tube a perfectly linear beam deflection will produce a non-linear scan. Both left and right deflection extremes would be expanded. By reducing the value of capacitor 18 from infinitely large to lower values, the magnitude of waveform C will increase. The effect of the drooping voltage at each end of this waveform (a point just to the left of *a* and at point *e* on the time scale) will be to reduce the scan rates at both left and right extremes on the raster. This compensation can be overdone by making capacitor 18 too small. Therefore the capacitor value is chosen for the desired compensation for the particular CRT being used. For the circuit, the component values of which are to be detailed subsequently, the optimum value produced a waveform typically having a 25 volt peak to peak value and an average value of about 55 volts (the zero voltage line is not shown in graph *c*). Thus the voltage waveform is a function of the integrated deflection current.

In the above circuit a number of additional components, often used in actual circuits, have not been shown or mentioned. These comprise small shunt capacitors, and series inductors and possible resistor diode combinations connected into various parts of the circuit to suppress parasitic signals. These parasitic signals can interfere with normal circuit action and can produce undesirable electromagnetic emissions that can create r-f interference, not only in the receiver in which they exist, but also in nearby receivers. Since these parasitic-suppression circuit elements are well known in the art, and do not contribute to the invention or its understanding, they will not be shown or discussed herein.

Waveform A of FIG. 2 shows the voltage appearing across switch 11. This is called the flyback pulse which typically has a peak amplitude of about 440 volts. The primary of transformer 16 is coupled to switch 11 by means of capacitor 30. The primary inductance of transformer 16 is made large in comparison with the inductance of coils 12. Capacitor 30 is made large enough to couple the switch circuit to the flyback pulse transformer 16. The waveform across capacitor 30 will resemble the waveform across capacitor 18 but will have a considerably smaller waveform amplitude at the same average voltage. Transformer 16 has a large step-up ratio and produces a positive pulse of about 9 k.v. at its secondary. The voltage tripling rectifier 31 develops a high positive voltage for the CRT at about 27 k.v.

It can be seen that if the 150V supply were to vary, the deflection current would also vary and the high voltage would vary in proportion to deflection. In terms of raster width these effects tend to compensate. That is as a deflection current increase would tend to widen the raster, the increase in high voltage would tend to narrow it. However, since raster width is directly proportional to deflection current and inversely proportional to the square root of the high voltage, such compensation is only partial. Accordingly some form of regulation is needed. To regulate the 150V supply would involve an expensive device because the current drain is substantial. Accordingly, in commercial practice, it has been found expedient to permit the 150V supply to vary, but to employ a relatively simple regulator in the switch circuit that receives its input energy from that supply.

In the foregoing circuit analysis, it was shown that the charge on capacitor 23, after going through a ringing cycle with coil 24, was transferred to capacitor 18. Part of the charge was transferred directly and the rest by way of the field about coils 12. In any event capacitor 18 receives its charge from capacitor 23. The initial charge on capacitor 23 is determined by the action of transformer 22 and comes from the 150V supply.

Attention is now directed to saturable core transformer 42, secondary coils 40 and 41 of which are connected across winding 26 of transformer 22 through a reverse current arrestor comprising diode 33, resistor 32 and capacitor 34. Thus coils 40 and 41 act as a variable inductance in parallel with coil 26, and their shunting value will be determined by the value of current in primary coil 43. Coil 26 (in conjunction with the other components) resonates capacitor 23 in the charge transfer cycle as shown by the upper half of waveform E on FIG. 2. Accordingly, if the value of the inductance shunting coil 26 is reduced, the charge present on capacitor 23 at time *c* will also be reduced. Therefore, as the current in coil 43 increases, capacitor 23 will receive less charge, less charge will be transferred to capacitor 18, and reduced deflection current will result (along with less high voltage and lower average voltage on capacitors 18 and 30. The converse is also true.

Transistor 44 supplies current to coil 43 of saturable core transformer 42 by way of surge limiting resistor 45 and a 70V supply connected to coil 43. Transistor 44 operates in the pulsed mode and rectifier 46 is poled across the primary coil 43 to convert the transistor collector current pulses to continuous d.c. In operation the current flowing in coil 43 will be governed largely by the duration of conduction of transistor 44. Resistors 47 and 49 and potentiometer 48 act as a variable voltage divider connected across capacitor 18. Zener diode 50 will conduct only when the voltage at the arm of potentiometer 48 exceeds the zener voltage. The arm of potentiometer is set so that transistor 44 is driven into conduction during the maximum positive excursion of the waveform across capacitor 18. (This is waveform C of FIG. 2.) If only the upper tip of waveform *c* were sufficient to drive transistor 44 into conduction, any increase in the amplitude of the waveform will be seen to increase the duration of conduction. Thus if the voltage across capacitor 18 tends to rise, as would happen for example if the voltage of the 150V supply rises, the conduction of transistor 44 would increase. This would increase the saturation of transformer 42 thereby increasing the shunting of coil 26 by coils 40 and 41. This in turn would reduce the charge on capacitor 23 at time *c* and this would reduce the deflection current value. Consequently this circuit acts to maintain a constant deflection current and a constant high voltage. A change in the setting of potentiometer 48 will adjust the circuit to a different operating point which would produce a different deflection current and high voltage. While this will vary the raster width to some degree, the control is ordinarily labeled HIGH VOLTAGE ADJUST. It will permit setting the high voltage to a particular value and will regulate it in terms of 150V supply voltage variations.

The prior art circuit of FIG. 1, and as described above, is in wide commercial use. However, it does have a limitation in an area to be described hereinafter.

In smaller CRT screen sizes, having relatively narrow deflection angles, pincushion distortion of the raster is not a problem. However, in larger tube sizes, such as the currently popular 25V tube, and with wide angle deflection tubes, it is desirable to compensate for pincushion distortion. Since the radius of curvature of the CRT's faceplate is much greater than the CRT's radius of deflection, the raster is subjected to a geometrically induced magnification. When looking at the raster produced by a deflection system having constant horizontal deflection currents, the raster will be wider at the top and bottom extremes and narrowest at the center of the tube.

To compensate for this distortion, a correction circuit is included in the horizontal deflection circuit. A pincushion correction circuit 60 controls the current flowing in the deflection coils 12. The secondary windings of saturable transformer 61 act as a variable inductor connected in series with coils 12. The pincushion correction circuits 60 receive a vertical deflection signal on line 64 from the TV receiver. This signal is so phased and shaped, by circuits well known in the art, that transformer 61 is caused to saturate to a lesser degree at the vertical deflection extremes, and to a greater degree at the center of the raster. Since the correction circuit is effectively varying the inductance in series with the deflection coils 12, the ratio of deflection to high voltage varies. This means that raster width is modulated. When the series inductance of the secondary of transformer 61 is maximum, the deflection current to high voltage ratio is reduced and raster width is narrowed. Since this condition occurs at the top and bottom raster portions, pincushion correction is achieved.

Unfortunately, the addition of pincushion correction to the circuit of FIG. 1, produces an undesired reaction in the regulator circuit. As the inductance in series with coils 12 varies, the waveform across capacitor 18 will tend to vary. Since the regulator circuit acts to maintain a constant voltage across capacitor 18, for any given setting of potentiometer 48, the pincushion correction circuit will modulate the regulator and thereby cause the high voltage to vary while the deflection current is held relatively constant. The high voltage tripler 31 contains a capacitive load and the high voltage magnitude cannot rapidly follow variations in its input. This lag introduces highly undesirable raster distortions that are difficult to correct. The conventional solution to this problem is to add further raster correction in the horizontal system.

A second problem with the prior art circuit lies in its insensitivity to high voltage load variations. In a typical CRT the load current can vary from almost zero for a dark raster to as much as 1.5 ma at full brightness. This represents a power variation of from almost zero to about 40 watts (assuming about 27 k.v.) Since the regulator acts pon the deflection circuit alone, it will not respond to such load changes. Accordingly the high voltage will not be regulated as a function of load current and its output will vary strongly with CRT beam current variations. This produces uncontrolled width variations and blooming in picture highlight regions.

DESCRIPTION OF THE INVENTION

Figures 3, 4, 5:
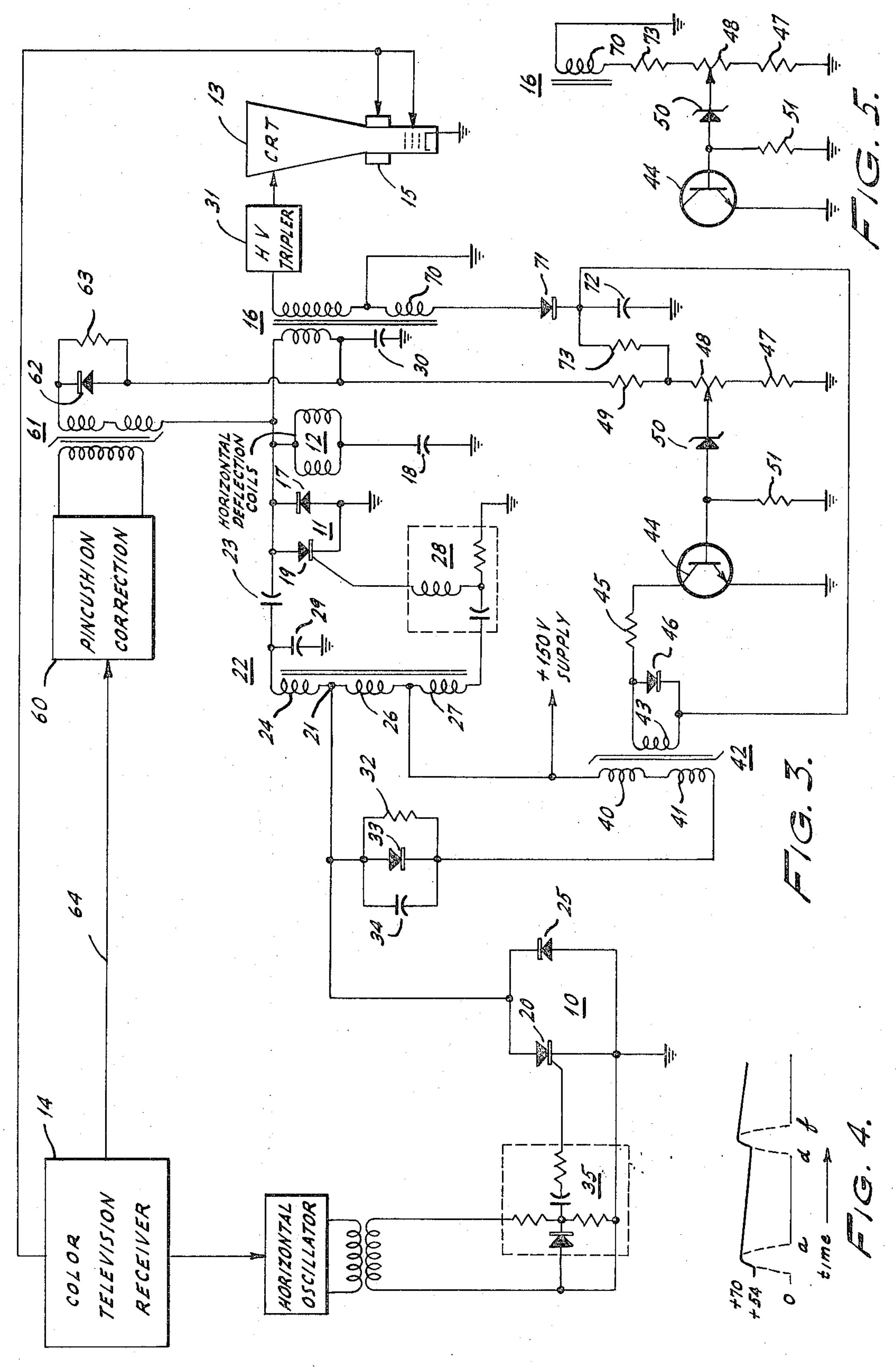
FIG. 3 is a partial block-schematic diagram of the circuit of the invention.
FIG. 4 is a waveform of the voltage appearing across capacitor 72 of FIG. 3.
FIG. 5 is a partial schematic diagram showing an alternative way in which to connect the input to the regulator circuit of FIG. 3.

The circuit of FIG. 3 is generally similar to that of FIG. 1, but FIG. 3 embodies those novel circuit features that characterize the invention. For example, the source of signal and bias for transistor 44 is different and the pincushion correction is applied differently. A pulse winding 70 on transformer 16 produces a signal having the shape of waveform A of FIG. 2 but having a peak amplitude of about 70 volts. Diode 71 and capacitor 72 rectify and filter this pulse to provide the 70V collector supply for transistor 44. In addition resistor 73 applies a portion of the signal across capacitor 72 to the bias network that supplies base current to transistor 44. A portion of the voltage across capacitor 30 is also applied to the voltage divider including resistors 47 and 49 and potentiometer 48. Thus the conduction of transistor 44 is controlled by the combined voltage across capacitors 30 and 72.

FIG. 4 shows the waveform of the voltage across capacitor 72, the value of which is chosen to give the desired ripple. The waveform has a 70 volt peak and a 16 volt ripple. The dashed line shows the shape of the pulse from winding 70. It can be seen that if resistors 49 and 73 are of about equal value, the current in potentiometer 48 will be dominated by the current supplied by way of resistor 73. As noted above in reference to FIG. 1, average voltage across capacitor 30 is about 55 volts, the same average value as that across capacitor 18. Since the waveform of FIG. 4 predominates in controlling bias on the regulator transistor, conduction occurs during the raster flyback interval and this is more closely associated with the charging circuit for capacitor 23. This is desired to reduce regulator interaction with the horizontal oscillator. In addition the circuit will be responsive to high voltage load or CRT beam current variations. With increased CRT beam current, the pulse present on winding 70 will drop in amplitude because transformer 16 will be more heavily loaded. This will reduce the conduction of transistor 44, increase the inductance of windings 40 and 41 of saturable core transformer 42, increase the deflection and drive to transformer 16, and thereby increase the high voltage output of tripler 31.

In contrast to the series circuit arrangement described above with reference to the conventional circuit illustrated in FIG. 1, in the improved circuit of FIG. 3, the pincushion is applied in shunt with the primary of transformer 16. The secondary of saturable core transformer 61 is connected in series with a reverse current arrestor comprising diode 62 and resistor 63. This combination is in shunt with the primary of transformer 16. For a constant pulse voltage across trace switch 11 any variation in the secondary inductance of transformer 61 will vary the ratio of deflection to high voltage thereby varying raster width. Since the action of the regulator circuit is to maintain a constant pulse output the deflection varies. For example when the pincushion transformer 61 is at maximum saturation the secondary inductance is minimum, thereby producing maximum shunting of the primary of transformer 16. To maintain the constant drive to winding 70 the regulator causes the circuit to increase drive. This increases the deflection relative to the high voltage. This condition will exist at the center of the raster. At the top and bottom of the raster the core saturation of transformer is minimum, the secondary inductance is maximum, and the circuit drive and deflection is reduced by the regulator to maintain constant high voltage. Since high voltage variation is not required for pincushion correction, the lag associated with the high voltage tripler does not produce any raster distortion.

If winding 70 were the sole source of base current in the regulator transistor, as shown in the partial schematic of FIG. 5, the high voltage would be held substantially constant as a function of loading and pincushion circuit operation. However regulation with respect to the 150V supply would not be as good as may be desired. Accordingly the base current is derived from a combination of the pulse from winding 70 by way of resistor 73 and the charge from capacitor 30, by way of resistor 49. Since the voltage across capacitor 30 is related to the deflection drive, the regulator operates in respect to the 150V supply as was described for the prior art circuit. In practice, pulse control action of the circuit is adjusted to increase the beam current regulation (for example by reducing the value of resistor 73 relative to that of resistor 49) until the regulation relative to the 150V line degrades. A good compromise has been found where the high voltage beam current regulation makes the high voltage power supply display an internal resistance of about 1.8 megohms. (An unregulated supply would have an internal resistance of about 5 megohms.) For this condition the high voltage will vary less than 1 percent for a-c power line variations of from 105 to 135 volts. The high voltage regulation could be improved at the expense of poorer 150V supply regulation response, but the values chosen give the most acceptable TV picture performance.

FIG. 5 shows the regulator input circuit where only a pulse input is employed. As described above, pulse winding 70 is directly connected across the voltage divider comprised of resistors 73, 48, and 47. As described before transistor 44 conducts only during the most positive portion of the pulse input. This occurs during the flyback interval. Operation of the regulator circuit is as described above.

Component values tabulated below have been used in the circuit arrangement of FIG. 3 to yield the operating characteristics described:

| | |
|---|---|
| Deflection coils 12 | 360 mhenry |
| CRT | 25VAQP22 |
| Transformer 16 | Primary turns 62<br>Secondary turns 1080<br>Pulse winding turns 10<br>Ferrite core: Indiana General No. JF-2835-1 |
| Diode 17 | RCA-TA7886 |
| Diode 25 | RCA-TA7887 |
| Capacitor 18 | 3 microfarads |
| SCR 19 | RCA 40640 |
| SCR 20 | RCA 40641 |
| Transformer 22 | Coil 24 — 60 mhenry<br>Coil 26 — 4.5 mhenry<br>Coil 27 — 60 mhenry<br>Ferrite Core: Stackpole 50-348 with 0.085 inch air gap |
| Capacitor 23 | 0.075 microfarad |
| Capacitor 29 | 0.072 microfarad |
| Capacitor 30 | 1.5 microfarads |
| Resistor 32 | 1000 ohms, 2 w. |
| Diode 33 | 1N4384 |
| Capacitor 34 | 220 pfarads |
| Transformer 42 | Primary 1.8 henry<br>Secondary 1.8 mhenry(each leg)<br>Ferrite Core: Stackpole 50-348 with 0.002 inch air gap |
| Transistor 44 | Philco-Ford 34-6002-55 |
| Resistor 45 | 470 ohms 5 w. |
| Diode 46 | Philco-Ford 34-8054-23 |
| Resistor 47 | 390 ohms |
| Potentiometer 48 | 100 ohms |
| Resistor 49 | 5.6k ohms 2w |
| Diode 50 | Philco-Ford 34-8057-49 |
| Resistor 51 | 1.2k ohms |
| Transformer 61 | Primary 1.3 mhenry<br>Secondary 11.7 mhenry(each leg)<br>Ferrite Core: Stackpole 50-348 with .0015 inch air gap |
| Diode 62 | 1N4384 |
| Resistor 63 | 2.2 k ohms 1w |
| Diode 71 | Philco-Ford 34-8054-20 |
| Capacitor 72 | 0.18 microfarad |
| Resistor 73 | 5.6 k ohms 2w |

The drawings and accompanying description are directed to an improvement in switch type horizontal deflection circuits. It will be understood that alternatives will occur to a person skilled in the art. It is intended that the scope of the invention be limited only by the claims that follow.

I claim:

1. In a magnetically deflected cathode-ray-tube television type display employing a switch-type of horizontal deflection current generator; said generator including bi-directionally conductive trace and commutator switches, means connected to said switches for so controlling the conduction intervals of said switches that a horizontal deflection current waveform is generated, electronic regulator means connected to said switches for controlling the magnitude of said current waveform; a high voltage rectifier to provide high voltages necessary for cathode-ray tube operation; means, including at least a transformer, coupled to said generator for supplying pulses to energize said rectifier; and means connected to said generator circuit for modifying said deflection current waveform to provide for pincushion distortion correction; the improvement comprising:

connecting the input circuit of said regulator to a source of potential generated from a combination of a first control potential produced by said means that energizes said high voltage rectifier and a second control potential having a magnitude that is proportional to the amplitude of said deflection current wave.

2. The improvement of claim 1 wherein said source of potential supplies a rectified and partly filtered pulse obtained from a winding on said pulse transformer.

3. The improvement of claim 2 wherein said second control potential is the potential developed across a capacitor connected to said transformer and having a value that will, in conjunction with said transformer, result in integrator action to produce a potential proportional to the integrated value of deflection current.

4. A magnetically deflected cathode ray tube television type display having a combined high voltage source and horizontal deflection current generator comprising:

a low-voltage power supply for energizing said generator, bi-directionally conducting trace and retrace switches connected to control the flow of energy from said supply, a horizontal deflection coil mounted on said tube and coupled to said switches, means for controlling the conduction interval of said switches to provide the desired flow of current in said deflection coil, a pulse transformer coupled to said switches and arranged to provide a high voltage pulse that can be rectified to supply the high voltage requirements of said tube, an electronic regulator connected to control the transfer of energy from said low voltage power supply to said deflection coil, and means for controlling said regulator in response to a combination of the signal from said pulse transformer and a signal obtained by integrating the deflection current wave.

5. The generator of claim 4 wherein said pulse transformer signal is rectified and partially filtered.

6. The generator of claim 5 wherein the integrated deflection current wave is obtained from a capacitor connected in series with said pulse transformer.

* * * * *

PO-1050
(5/69)

UNITED STATES PATENT OFFICE
CERTIFICATE OF CORRECTION

Patent No. 3,819,979 Dated June 25, 1974

Inventor(s) Walter Truskalo

It is certified that error appears in the above-identified patent and that said Letters Patent are hereby corrected as shown below:

Column 8, line 30, change "pon" to --upon--.

Column 11, lines 11 and 12, the first and second lines of claim 2, delete "source of" and insert --first control--.

Column 11, line 12, the second line of claim 2, delete "supplies" and insert --is--.

Column 11, line 13, the third line of claim 2, delete "pulse".

Signed and sealed this 17th day of September 1974.

(SEAL)
Attest:

McCOY M. GIBSON JR.
Attesting Officer

C. MARSHALL DANN
Commissioner of Patents